US009270568B2

(12) United States Patent
Flinta et al.

(10) Patent No.: US 9,270,568 B2
(45) Date of Patent: Feb. 23, 2016

(54) METHOD AND AN APPARATUS FOR DETERMINING THE PRESENCE OF A RATE LIMITING MECHANISM IN A NETWORK

(71) Applicant: Telefonaktiebolaget L M Ericsson (publ), Stockholm (SE)

(72) Inventors: Christofer Flinta, Stockholm (SE); Andreas Johnsson, Uppsala (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 127 days.

(21) Appl. No.: 14/056,706

(22) Filed: Oct. 17, 2013

(65) Prior Publication Data

US 2014/0112148 A1 Apr. 24, 2014

Related U.S. Application Data

(60) Provisional application No. 61/715,454, filed on Oct. 18, 2012.

(30) Foreign Application Priority Data

Oct. 18, 2012 (EP) .................................... 12189033

(51) Int. Cl.
H04L 12/26 (2006.01)

(52) U.S. Cl.
CPC .............. *H04L 43/12* (2013.01); *H04L 43/087* (2013.01); *H04L 43/10* (2013.01); *H04L 43/16* (2013.01); *H04L 43/0858* (2013.01); *H04L 43/0864* (2013.01); *H04L 43/106* (2013.01)

(58) Field of Classification Search
None
See application file for complete search history.

(56) References Cited

U.S. PATENT DOCUMENTS 6,757,255 B1 * 6/2004 Aoki ...................... H04L 1/187
370/229
7,065,482 B2 * 6/2006 Shorey ................ H04L 12/2602
703/2

(Continued)

FOREIGN PATENT DOCUMENTS

WO WO 2013/180613 A2 12/2013

OTHER PUBLICATIONS

Extended European Search Report for PCT Application No. PCT/SE2010/051093; 6 pages.

(Continued)

*Primary Examiner* — Jeffrey M Rutkowski
*Assistant Examiner* — Jonathan B Wood
(74) *Attorney, Agent, or Firm* — Myers Bigel & Sibley, P.A.

(57) ABSTRACT

A method and device for determining the presence of a rate limiting mechanism arranged between a sending and a receiving data communication node in a data transfer path of a communication network is presented. The method includes determining time difference values for probe packets in a train of probe packets sent from the sending node and received in the receiving node after having traversed the data transfer path during real-time operation of the data transfer path. The method further includes determining the presence of a rate limiting mechanism in the data transfer path upon detecting that an increase in the time difference value between received probe packets in the train of probe packets exceeds a threshold criterion. Other methods and devices for determining the absence of a rate limiting mechanism and corresponding computer program products are further disclosed.

14 Claims, 8 Drawing Sheets

(56) References Cited

U.S. PATENT DOCUMENTS

| | | | | |
|---|---|---|---|---|
| 7,647,411 | B1* | 1/2010 | Schiavone | 709/206 |
| 7,804,777 | B2* | 9/2010 | Krueger | H04L 12/2856 370/230.1 |
| 8,437,284 | B2* | 5/2013 | Plamondon | H04L 1/1887 370/293 |
| 8,990,380 | B2* | 3/2015 | Jackowski | H04L 47/2475 709/202 |
| 2004/0057446 | A1* | 3/2004 | Varsa | H04L 29/06027 370/412 |
| 2004/0133391 | A1* | 7/2004 | Bovo | H04J 3/0682 702/178 |
| 2004/0228289 | A1* | 11/2004 | Sano | H04L 12/2697 370/253 |
| 2005/0232227 | A1* | 10/2005 | Jorgenson | H04L 41/14 370/351 |
| 2006/0190594 | A1* | 8/2006 | Jorgenson | H04L 12/2697 709/224 |
| 2007/0140306 | A1* | 6/2007 | Klein | H04L 1/205 370/516 |
| 2007/0248101 | A1* | 10/2007 | Zeitak | H04L 47/10 370/395.52 |
| 2007/0286075 | A1* | 12/2007 | Shoham | H04L 12/2697 370/230 |
| 2008/0101378 | A1* | 5/2008 | Krueger | H04L 12/2856 370/395.52 |
| 2008/0225721 | A1* | 9/2008 | Plamondon | H04L 47/10 370/235 |
| 2008/0304413 | A1* | 12/2008 | Briscoe | H04L 69/16 370/235 |
| 2009/0262657 | A1* | 10/2009 | Ekelin | H04L 41/0896 370/252 |
| 2010/0008233 | A1* | 1/2010 | Ee | H04L 12/2697 370/241 |
| 2010/0097931 | A1* | 4/2010 | Mustafa | H04L 43/026 370/235 |
| 2010/0165872 | A1* | 7/2010 | Jiang | H04L 43/0817 370/253 |
| 2010/0172253 | A1* | 7/2010 | Morita | H04L 1/0014 370/252 |
| 2010/0188989 | A1* | 7/2010 | Wing | H04L 43/065 370/235 |
| 2010/0195488 | A1* | 8/2010 | Mehrotra | H04L 1/0002 370/216 |
| 2010/0208732 | A1* | 8/2010 | Rodbro | H04L 41/0896 370/390 |
| 2011/0154101 | A1* | 6/2011 | Merwe | G06F 11/3006 714/5.1 |
| 2011/0222431 | A1* | 9/2011 | Oue | H04L 43/0888 370/252 |
| 2012/0099689 | A1* | 4/2012 | Mahkonen | H04W 56/0075 375/371 |
| 2012/0117267 | A1* | 5/2012 | Holloway | H04L 67/146 709/233 |
| 2012/0224484 | A1* | 9/2012 | Babiarz | H04L 41/5019 370/235 |
| 2012/0281715 | A1* | 11/2012 | Shojania | H04L 12/2671 370/468 |
| 2013/0322255 | A1* | 12/2013 | Dillon | 370/236 |
| 2014/0016464 | A1* | 1/2014 | Shirazipour | H04L 47/11 370/235 |
| 2014/0112318 | A1* | 4/2014 | Zhou | H04W 72/04 370/336 |
| 2014/0248852 | A1* | 9/2014 | Raleigh | H04M 15/723 455/407 |

OTHER PUBLICATIONS

Tanenbaum: "Computer networks" Congestion Control Algorithms; Prentice Hall Inc, Upper Saddle River, New Jersey 07458; XP002693877, ISBN: 0-13-349945-6; Dec. 31, 1996; pp. 379-386.

Wikipedia: "Welch's t test", Creative Commons Attribution-ShareAlike License; Wikimedia Foundation, Inc., Retrieved from "http://en.wikipedia.org/w/index.php?title=Welch%27s_t_test&oldid=607601075" 2 pages.

Wikipedia: "Student's t-test", Creative Commons Attribution-ShareAlike License; Wikimedia Foundation, Inc., Retrieved from "http://en.wikipedia.org/w/index.php?title=Student%27s_t-test&oldid=612170281" 9 pages.

Wikipedia: "Student's t-distribution", Creative Commons Attribution-ShareAlike License; Wikimedia Foundation, Inc., Retrieved from "http://en.wikipedia.org/w/index.php?title=Student%27s_t-distribution&oldid=610986885" 16 pages.

Wikipedia: "Statistical hypothesis testing", Creative Commons Attribution-ShareAlike License; Wikimedia Foundation, Inc., Retrieved from "http://en.wikipedia.org/w/index.php?title=Statistical_hypothesis_testing&oldid=611531027" 28 pages.

Dansk: "Computer Vision", Artificiell Intelligens, HKGBB0; 810314-0276 15 pages.

Internet protocol data communication service-IP packet transfer and availability performance parameters, International Telecommunication Union; Series Y: Global Information Infrastructure, Internet Protocol Aspects and Next-Generation Networks; Internet protocol aspects—Quality of service and network performance; Recommendation ITU-T Y.1540 (Mar. 2011); 52 pages.

Chimento et al.: "Defining Network Capacity", Network Working Group, Request for Comments: 5136; Category: Informational; 14 pages.

Chiba et al.: "Cisco Service Level Assurance Protocol draft-cisco-sla-protocol-01", Network Working Group, Internet-Draft, Intended Status: Informational; 26 pages.

Hedayat et al.: "A Two-Way Active Measurement Protocol (TWAMP)", Network Working Group, Request for Comments: 5357; Category: Standards Track; 26 pages.

Shalunov et al.: "A One-way Active Measurement Protocol (OWAMP)", Network Working Group, Request for Comments: 4656; Category: Standards Track; 56 pages.

Richard L. Smith: "Comparing Two Means" Retrieved on Jul. 2, 2014 from: "http://www.unc.edu/~rls/s151-09/class26.pdf", 19 pages.

* cited by examiner

METHOD AND AN APPARATUS FOR DETERMINING THE PRESENCE OF A RATE LIMITING MECHANISM IN A NETWORK

CROSS REFERENCE

The present application claims priority to European Application No. 12189033.9, filed Oct. 18, 2012, and also to U.S. provisional Patent Application No. 61/715,454, filed Oct. 18, 2012, the disclosures of both of which are incorporated herein by reference as if set forth in their entirety herein.

TECHNICAL FIELD

The present disclosure relates generally to determining the presence or absence of a rate limiting mechanism in a network.

BACKGROUND

The capability of estimating available capacity, end-to-end, over a data transfer path of a data communication system comprising a data network is useful in several contexts, including network monitoring and server selection. Passive estimation of available capacity of a data transfer path, such as estimation of bandwidth of an end-to-end data transfer path is possible in principle, provided all network nodes in the data transfer path can be accessed. However, this is typically not possible, and estimation of available end-to-end capacity of the data transfer path, is typically done by active probing of the data transfer path. The available capacity such as bandwidth can be estimated by injecting data probe packets into the data transfer path, and then analyzing the observed effects of cross traffic on the probe packets. This kind of active measurement requires access to sender and receiver hosts, typically data network nodes, only, and does not require access to any intermediate nodes in the data transfer path between the sender and receiver nodes.

In the art, methods such as BART ("Bandwidth Available in Real Time") and TOPP ("Trains of Packet Pairs") have been developed for estimating capacity in a network. These methods comprise the sending of a sequence of packets, also known as a probe train, from a transmitting node to a receiving node. The probe train is sent at a specific rate depending on packet size and time interval between the packets in the train. If the send rate of the train is greater than the available path capacity (APC) of the network path, there will be a transient congestion at a bottleneck link. Due to the congestion, the probe-train packets will be buffered in the node just before the bottleneck link which will spread out the packets in time. The probe train will therefore be received by the receiving node at a lower rate than the send rate. See the document "Probing-Based Approaches to Bandwidth Measurements and Network Path Emulation" by Bob Melander, PhD Thesis, Uppsala University, 2003, for a description of TOPP and European Patent 1952579 for a further description of the BART method.

Further, the IETF IP Performance Metrics (IPPM) working group has defined two IP active measurement protocols: One-Way Active Measurement Protocol (OWAMP), RFC 4656, and Two-Way Active Measurement Protocol (TWAMP), RFC5357. OWAMP is designed for measuring one-way packet delay and one-way packet loss between two hosts. TWAMP is based on OWAMP. TWAMP is designed for measuring one-way and two-way (round-trip) packet delay and packet loss between two hosts.

In many networks, Quality of Service, QoS, mechanisms are included. Recent studies have shown that available capacity measurement methods may produce erroneous estimates in networks where QoS mechanisms are deployed, see e.g. "Available Bandwidth Measurements in QoS Environments" by Mark Bechtel and Paraskevi Thanoglou, Master Thesis, KTH, 2010.

Examples of such QoS mechanisms are rate limiting mechanisms such as a traffic shaper and a traffic policer, and these are often implemented as a token bucket, A token bucket is an algorithm used in packet switched computer networks and telecommunications networks to check that data transmissions conform to defined limits on bandwidth and burstiness (a measure of the unevenness or variations in the traffic flow). The token bucket algorithm is based on an analogy of a fixed capacity bucket into which tokens, normally representing a unit of bytes or a single packet of predetermined size, are added at a fixed rate. When a packet is to be checked for conformance to the defined limits, the bucket is inspected to see if it contains sufficient tokens at that time. If so, the appropriate number of tokens, e.g. equivalent to the length of the packet in bytes, are removed ("cashed in"), and the packet is passed, e.g., for transmission. If there are insufficient tokens in the bucket the packet does not conform and the contents of the bucket are not changed. Non-conformant packets can be treated in various ways:

They may be dropped.
 They may be enqueued for subsequent transmission when sufficient tokens have accumulated in the bucket.
 They may be transmitted, but marked as being non-conformant, possibly to be dropped subsequently if the network is overloaded.

A conforming flow can thus contain traffic with an average rate up to the rate at which tokens are added to the bucket, and have a burstiness determined by the depth of the bucket, This burstiness may be expressed in terms of either a jitter tolerance, i.e. how much sooner a packet might conform (e.g. arrive or be transmitted) than would be expected from the limit on the average rate, or a burst tolerance or maximum burst size, i.e. how much more than the average level of traffic might conform in some finite period.

Thus, in short, if a token bucket or any other rate limiting mechanism is provided in a network, this may have a serious effect on available capacity measurements.

SUMMARY

Embodiments disclosed in the present disclosure relates to mechanisms to determine the presence or absence of a rate limiting mechanism in a data transfer path.

One embodiment relates to a method of determining the presence of a rate limiting mechanism arranged between a sending and a receiving data communication node in a data transfer path of a communication network. The method comprises the determining of time difference values between probe packets in a train of probe packets sent from the sending node and received in the receiving node after having traversed the data transfer path during real-time operation of the data transfer path. For the received probe packets, the presence of a rate limiting mechanism in the data transfer path is determined upon detecting that an increase in the time difference between received probe packets in the train of probe packets exceeds a threshold criterion.

One embodiment relates to a method of determining the absence of a rate limiting mechanism at a tight link in a data transfer path between a sending and a receiving data communication node of a communication network. The time difference values between probe packets in a train of probe packets sent from the sending node and received in the receiving node after having traversed the data transfer path during real-time operation of the data transfer path are determined. Based on these time difference values, the absence of a rate limiting mechanism at a tight link is determined if the time difference values between received probe packets in the train of probe packets are below a threshold criterion.

One embodiment relates to a device for determining the presence of a rate limiting mechanism arranged between a sending and a receiving data communication node in a data transfer path of a communication network. The device comprises a communications interface configured to communicate via the network and a processor coupled to the communications interface. The processor is configured to determine time difference values between probe packets in a train of probe packets sent from the sending node and received in the receiving node after having traversed the data transfer path during real-time operation of the data transfer path. The processor is further configured to determine the presence of a rate limiting mechanism arranged in said data transfer path upon detecting that an increase in the time difference value between received probe packets in the train of probe packets exceeds a threshold criterion.

One embodiment relates to a device for determining the absence of a rate limiting mechanism at a tight link in a data transfer path between a sending and a receiving data communication node of a communication network. The device comprises a communications interface configured to communicate via the network and a processor coupled to the communications interface. The processor is configured to determine, based on determined time difference values between probe packets in a train of probe packets sent from the sending node and received in the receiving node after having traversed the data transfer path during real-time operation of the data transfer path, the absence of a rate limiting mechanism at a tight link if the time difference values between received probe packets in the train of probe packets are below a threshold criterion.

An advantage with the above described embodiments is that the presence or absence of a rate limiting mechanism is determined by means of active measurements. Thereby the determination can be made without detailed knowledge of the network. As a consequence of the determination suitable measures may be taken when performing subsequent active measurements in the network.

Further advantages and features of embodiments of the present disclosure will become apparent when reading the following detailed description in conjunction with the drawings.

DETAILED DESCRIPTION

In this disclosure throughout, conventional terms and their abbreviations that have been considered to be well-known to the skilled person have been used as much as possible for a better understanding. Since they are considered to be well-known to the skilled person they are used without exhaustive definitions. Thus, only terms considered to require a more exhaustive explanation have been explained in more detail, often by means of concrete examples to assist understanding.

Herein, the term "capacity" includes "Available Path Capacity" (APC) as well as Tight Link Capacity" (TLC). These terms, per se, will be explained in more detail below, and is also described in ITU-T Recommendation Y.1540. Y.1540 also provides a description of the tight link as a concept.

All methods for measuring capacity metrics such as APC and TLC over a data transfer path of a data communication system using active probing are based on a model where probe packets are sent from a sender node to a receiver node of the data communication system. Time stamps of the probe packets at the sender and receiver node are then used by an algorithm to produce APC and TLC estimations.

Figure 1:
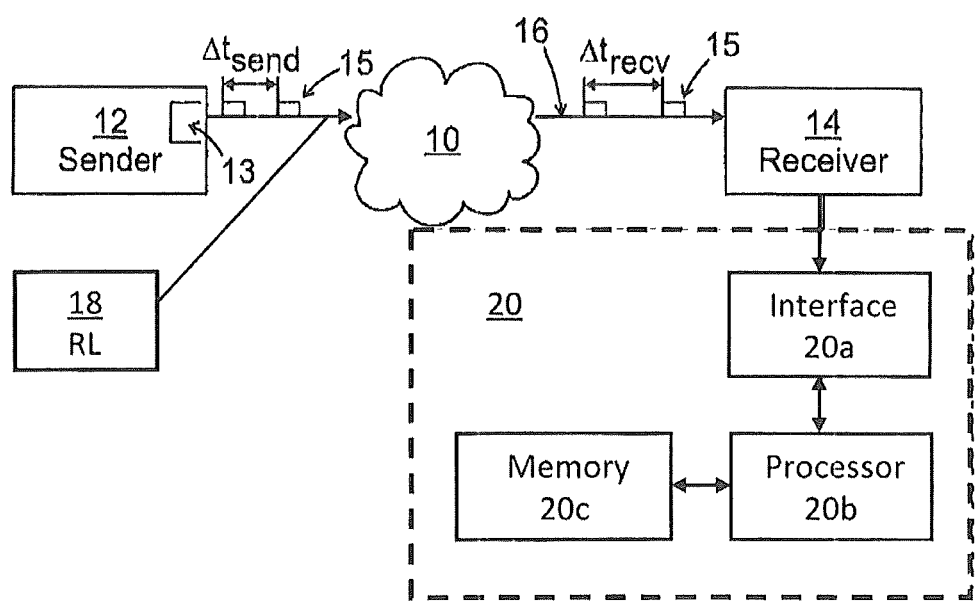
FIG. 1 is a schematic block diagram of a data transfer path of a data communication system in which embodiments of this disclosure are implemented.

Now is referred to FIG. 1 illustrating a schematic block diagram of a data communication system 10 in which embodiments of this disclosure can be implemented. The data communication system 10 comprises a data transfer path 16 that transfers data between data communication nodes 12, 14, for instance a sender node 12 and a receiver node 14. The sender node 12 transmits a train of probe packets 15 having a particular time interval $\Delta t\_send$ that traverse the data transfer path 16 during real-time operation of the data transfer path 16 to the receiver node 14, which receives the probe packets 15 having another particular time interval $\Delta t\_recv$ when received at the receiver node 14 in case of congestion in the transfer path 16. Typically, time stamps of the probe packets 15 at the sender node 12 and receiver node 14 are used by an algorithm to produce APC and TLC estimates, and measured data of the data transfer path 16. However, in case a rate limiting mechanism 18 is arranged in the data transfer path the result of the estimates will most likely be erroneous.

The data communication system 10 further comprises an apparatus 20 for determining the presence or absence of a rate limiting mechanism 18 of the data transfer path 16 in accordance with embodiments of the present disclosure. The data communication system 10 can constitute, or form a part of, a packet-switched data communication system including a data communication system or network, such as the Internet, a private intranet, etc. Typically, the apparatus 20 is arranged to communicate with the receiver node 14 or is contained in the same 14. In some embodiments, the components at 20a-c of FIG. 1 are provided externally of and separate from the receiver node 14. In the embodiments illustrated and described, all of the components 20a-c are provided as contained in the receiver node 14, but may also be provided externally of and separate from the receiver node 14, for example, in one or more other nodes of the communication system 10.

The apparatus 20 comprises a communications interface 20a arranged to communicate via the communication system. Coupled to the communications interface 20a is a processor 20b configured to determine time difference values for probe packets in a train of probe packets 15 sent from the sending node 12 and received in the receiving node 14 after having traversed the data transfer path 16 during real-time operation of the data transfer path 16. The processor 20b may be configured to extract time stamp information from received probe packets in order to determine the time difference values, Δt, for adjacent received probe packets. The time stamp information may also be provided to the processor 20b separate from the probe packets 15. The aforementioned time stamping at the sending and receiving nodes 12, 14 is not explicitly shown.

The processor 20b is further configured to detect an increase in the time difference between received probe packets in the train of probe packets and to determine the presence of a rate limiting mechanism arranged in the path 16 when said increase exceeds a threshold criterion. By determining the presence of a rate limiting mechanism, suitable measures can be taken. E.g. it can be determined to postpone APC measurements of the transfer path to a later time, attempt to eliminate the influence of the rate limiting mechanism, or to estimate and consider the configuration parameters of the rate limiting mechanism when performing APC and TLC measurements in the path. It may also be of great value when verifying Service Level Agreements (SLA) parameters or searching for configuration faults in the network.

The processor 20b may also be configured to perform the other embodiments described in the present disclosure. Methods used for determining the presence and/or absence will be further described with reference to FIGS. 2-13 below.

The processor 20b, may further be configured to calculate a strain ε, to calculates an inter-packet strain values of each pair of probe packets 15 in the received sequence of probe packets 15, and also to calculate the average and variance of the inter-packet strain values E. The processor 20b may further be configured to produce an estimate of the APC and TLC during said real-time operation of the data transfer path 16.

Figure 6:
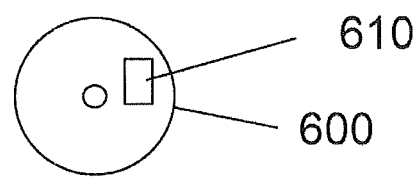
FIG. 6 schematically illustrates a computer program product according to an embodiment in the form of a CD ROM disc with a computer program performing the functionality of embodiments of the present disclosure.

The processor 20b of the apparatus 20 may be provided as a dedicated circuit such as a digital signal processor (DSP) or an Application Specific Integrated Circuit (ASIC). As an alternative it may be provided in the form of a processor with associated program memory including computer program code for performing the functionality. This computer program may also be a computer program product, for instance in the form of a computer readable storage medium or data carrier, like a CD ROM disc or a memory stick, carrying such a computer program with the computer program code, which will implement the function of the above-described module when being loaded into an apparatus 20. One such computer program product in the form of a CD ROM disc 600 with the above-mentioned computer program code 610 is schematically shown in FIG. 6.

Typically, the sender node 12 sends a train of N probe packet pairs 15 with probing rate u. State-of-the-art APC estimation methods produce one new estimate for each probe-packet train being transmitted from a sender to a receiver. Usually the probe-packet train is a relatively short burst of packets. In prior art methods the number of packets per burst has traditionally been between 2 and 20 packets, e.g. 17 packets. In a QoS environment deploying rate limiting mechanisms such as token buckets for traffic shaping and/or policing, a burst which is smaller than the token bucket burst size is transmitted faster than the rate r associated with the token bucket. This means that there will be no observation of strain. This causes problems for APC estimation methods as described above.

As previously mentioned an example of a quality of service mechanism is a token bucket function in a network node. A token bucket algorithm for traffic shaping will be described in the following. Tokens are added to the bucket with a rate r, i.e. every 1/r second. When a packet with size s arrives at the bucket, assuming s<n where n is the number of tokens in the token bucket, s tokens are removed from the bucket and then the packet is forwarded. If s>n no tokens will be removed from the bucket, instead the packet is considered non-conformant. Non-conformant packets can for example be sent at a later stage when enough tokens are available. The above example assumes that one token corresponds to 1 bit—this is however implementation specific and one token may e.g. correspond to the size of one or more maximum transmission units, MTUs, which is approximately 1500 bytes for IP packets. In case the token bucket is for traffic policing, the packets will be discarded instead of queued for later transmission.

Figure 2:
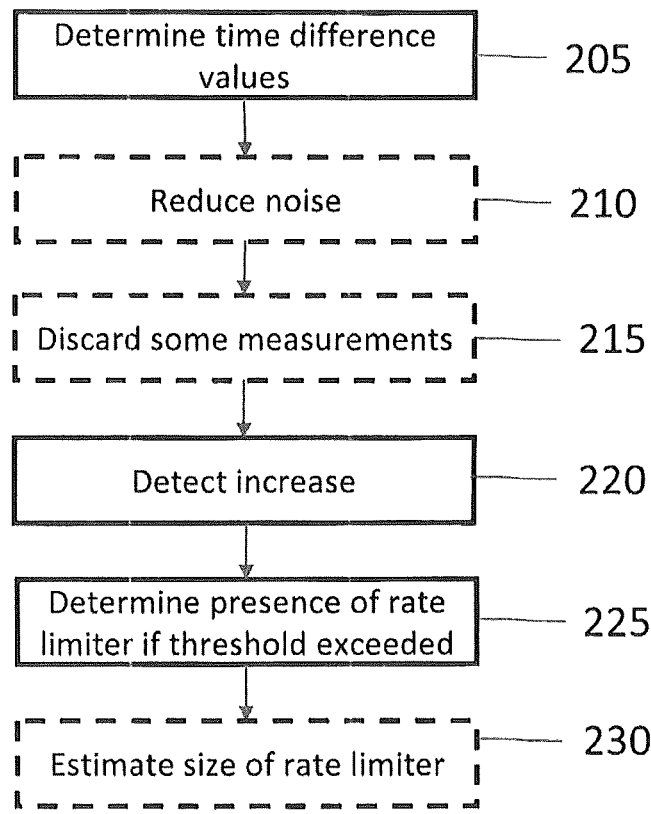
FIG. 2 is a flow diagram illustrating an embodiment of a method in a data communication system.

FIG. 2 is a flow diagram illustrating an embodiment of a method of determining the presence of a rate limiting mechanism arranged between a sending 12 and a receiving 14 data communication node in a data transfer path 16 of a communication network 10 (see FIG. 1). A train of probe packets sent from the sending node 12 is received in the receiving node 14 after having traversed the data transfer path 16 during real-time operation of the data transfer path.

In step 205 the time difference values between probe packets in a train of probe packets are determined. This could e.g. be determined by for each packet k, taking the time stamp of packet k minus the time stamp of packet k−1, i.e. by determining the time difference values between adjacent probe packets. This could also be determined by calculating mean values between non-adjacent probe packets.

In the optional step 210, noise reduction of the measurements is performed. The noise reduction may e.g. be performed by applying filter techniques, such as a Gaussian filter, a median filter or a moving average filter, on the time difference values in order to make these more reliable. According to an additional or alternative embodiment, noise is reduced by extracting time difference values for packets from a plurality of received probe packet trains, and then corresponding time difference values are compared. Values from packet trains that strongly diverge from values of other packet trains may then e.g. be discarded and/or average values from the probe packet trains may be determined.

In the optional step 215 at least the first and/or the last of the measured time difference values are discarded in order to avoid the influence of outliers. Preferably, a few values, e.g. 5-10, at both ends of the train are discarded.

In step 220 an increase in the time difference between received probe packets in the train of probe packets is detected. E.g. the first 50 received probe packets have time difference values that are approximately the same, but then one or more time difference values, e.g. for probe packets number 51 and 52 have time difference values that are higher than the time difference values determined for the first 50 received probe packets. Other packets that are not part of the probe packet train may be received between two adjacent received probe packets; however such other packets are not considered in the embodiments herein described.

In step 225 it is determined if the increase exceeds a threshold criterion and, upon detecting that said increase exceeds the threshold, the presence of a rate limiting mechanism is determined.

In the optional step 230, the burst size of the rate limiting mechanism is estimated by calculating the total size of the probe packets received before the receipt of probe packets affected by the rate limiter—i.e. the probe packets received before the increase in time difference. The estimation is e.g. done by summing the size of the received probe packets or by multiplying the number of received probe packets with the average size of these.

By applying step 230 it is thus possible to estimate the parameter configuration of a rate limiting mechanism using active measurements in the form of probe packets sent in the path of the rate limiting mechanism. This can e.g. be used for detecting configuration problems by the network operator, verifying configurations by the network customer, as well as automatically setting measurement parameters for real-time capacity estimation methods using probe packet trains. The estimated size of the rate limiting mechanism may thus be considered when performing real-time capacity measurements of the path in order to provide more reliable measurements.

Preferably, the probe packets received before the packet indicating the increase constitute a first subset of probe packets, and the probe packets received after said increase constitute a second subset of probe packets. The estimation of the size of the rate limiting mechanism will thus be achieved by calculating the total size of probe packets belonging to the first subset. The size estimation corresponds to a "minimum" size of the rate limiting mechanism. If there is other traffic, i.e. cross traffic, on the path those packets will also affect the rate limiting mechanism. E.g. in case of a token bucket implementation those packets will consume tokens and the estimated size will be lower than the actual size.

The step 225 of determining that the increase in the time difference value between received probe packets is due to a rate limiter can be accomplished in different ways. In one embodiment the threshold criterion that must be exceeded in order for the presence of a rate limiting mechanism to be determined is set as a fixed value. I.e. if the time difference value for two received adjacent probe packets exceeds e.g. 0.3 or 0.5 milliseconds then the threshold is determined to be exceeded. Thereby a very simple, however somewhat unreliable, way to determine the presence of a rate limiter is accomplished.

According to another embodiment the threshold criterion is set relative to a comparison time difference value determined based on at least the first two received probe packets or determined based on an average of a number of received time difference values. I.e. if the time difference value between later received probe packets is e.g. twice as large as the comparison time difference value then the threshold is determined to be exceeded. Thereby another simple way to determine the presence of a rate limiter is accomplished.

It appears that the time difference values for received probe packets affected by a rate limiter make up a step function $f(\Delta t)$, being equal to $\Delta t\_burstrate$ for a first set of received probe packets and equal to $\Delta t\_meanrate$ for a second set of received probe packets. The first set of probe packets thus has a time difference value $\Delta t$ that essentially corresponds to the burst rate of the rate limiting mechanism, whereas the second set of probe packets received in the receiving node has a time difference value $\Delta t$ that essentially corresponds to the mean rate of the rate limiting mechanism.

According to another embodiment the threshold criterion is determined to be exceeded when a plurality of consecutive time difference values, measured for probe packets received after the detected increase, exceeds said threshold criterion. Thereby yet another simple way utilizing the step function appearance; that also limits the influence of noise and other disturbances, to determine the presence of a rate limiter is accomplished.

According to another embodiment the threshold criterion is determined to be exceeded when the tangential of the function $f(\Delta t)$, i.e. the function $\theta(\Delta t)/\theta t$, exceeds a set value, where $f(\Delta t)$ is a function representing the time difference values between probe packets received in the receiving node, preferably between adjacent probe packets. This embodiment requires that the measured time difference values is analyzed and converted into a function $f(\Delta t)$. In some scenarios the function will be equal to a constant for all probe packets received prior to the detected increase and equal to a larger constant for probe packets received after the detected increase. This means that $\theta f(\Delta t)/\theta t$ will be zero for all time difference values except for the first value for which the increase is detected, i.e. the first measured time difference value that involves a probe packet that is affected by the rate limiter. Thereby another simple way, utilizing the step function appearance while also limiting the influence of noise and other disturbances, to determine the presence of a rate limiter is accomplished. The term step function is here meant to be understood as a piecewise constant function with two distinct regions having different constants. The step that indicates the border between the two regions may be instantaneous or be a gradual increase during the interval that that indicates the border.

By combining the above embodiments describing how to determine when the threshold criterion is exceeded may be improved by combining these with the steps any or both of the previously described steps of reducing noise 210 and discarding measurements 215 since these steps limit the disturbance of noise from the network or from disturbances in any of the sending or receiving nodes. The noise reduction may be performed by determining time difference values from a plurality of probe packet trains and the following step of determining the presence of a rate limiting mechanism may then comprise using an average of corresponding time difference values for each corresponding probe packet k from the plurality of probe packet trains. Thereby, the misperception that these disturbances are due to a rate limiting mechanism in the data transfer path is limited.

Figure 3:
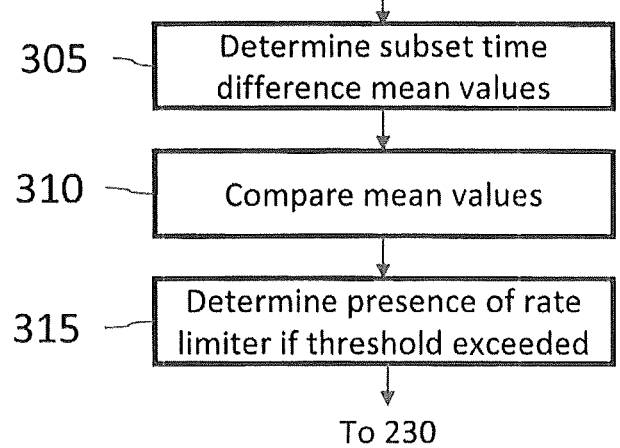
FIG. 3 is a flow diagram illustrating sub steps of the embodiment of FIG. 2.

FIG. 3 is a flow diagram illustrating an embodiment of determining the presence of a rate limiting mechanism. The embodiment may take place after detecting that an increase (detected in step 220) in the time difference value between received probe packets exceeds a threshold criterion. In step 305 it is determined that a first subset of the probe packets has a first time difference mean value and that a second subset of the probe packets has a second time difference mean value. Probe packets received before the probe packet that indicates the detected increase constitute a first subset of probe packets, and probe packets received after (and possibly including the probe packet indicating the increase) the increase constitute a second subset of probe packets. Step 305 may also be performed without prior increase detection, and thus merely on the basis of the determined time difference values, i.e. without knowing if (and between which packets) an increase exist. This may e.g. be accomplished by taking a first subset comprising probe packets from the beginning of the probe packet train and a second subset from the end of the probe packet train In step 310 the second time difference mean value is compared with the first time difference mean value. In case step 305 was performed without prior increase detection, the increase is detected in step 310 by the comparison between the first and second time difference values. In case the difference or ratio of these compared time difference values exceed a threshold criterion (e.g. set as described above), then it is in step 315 determined that the detected increase exceed the threshold criterion, and consequently that the detected increase is due to a rate limiting mechanism provided in the data transfer path 16.

It should be noted that the term mean value also is meant to include corresponding or similar terms such as median value and average value.

The method described with reference to FIG. 3 improves the reliability of the determination that the detected increase is due to a rate limiting mechanism. In fact, the increase in time difference values caused by a rate limiting mechanism is seldom temporary and instead lasts as long as the rate limiting mechanism is in steady state, which will be further discussed with reference to FIGS. 7-12. Thereby temporary increases caused by other factors will not be misinterpreted to be caused by rate limiting mechanisms when applying this method.

Figure 4:
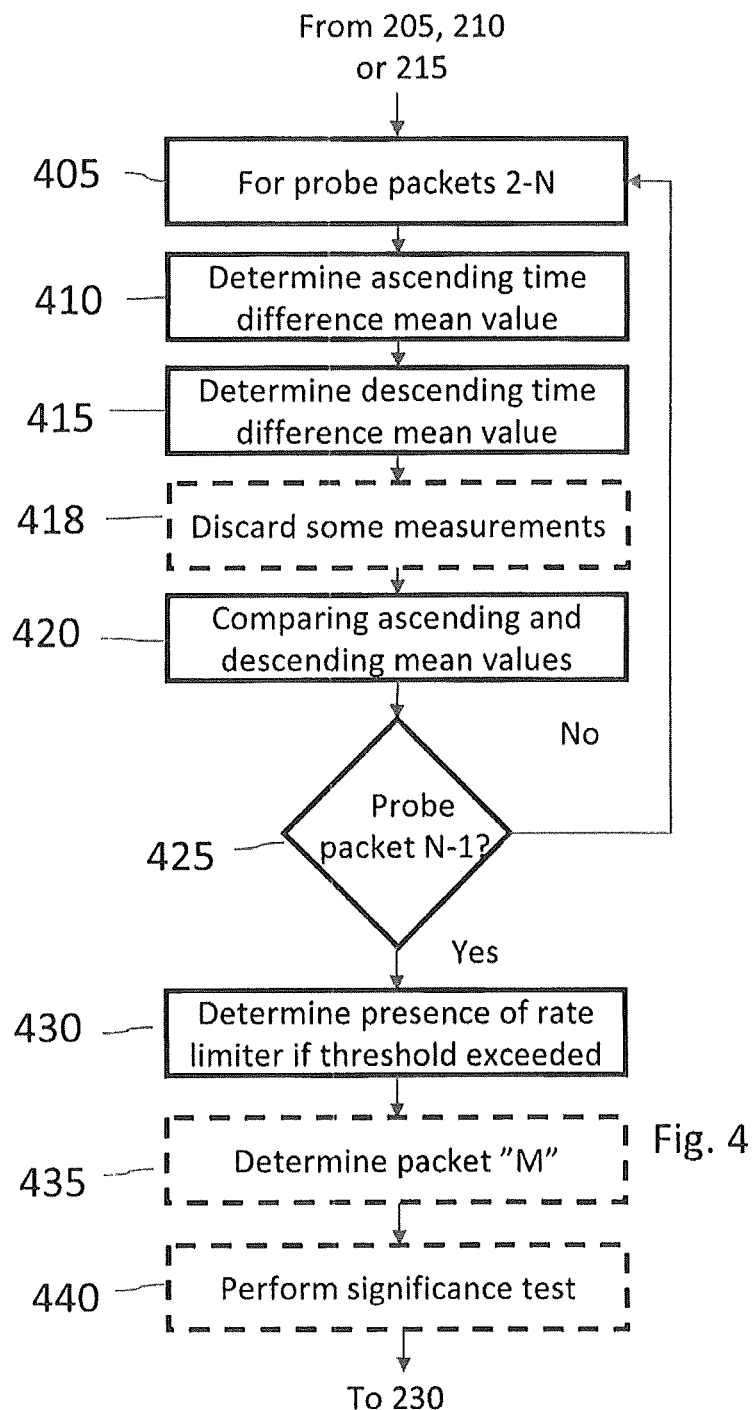
FIG. 4 is a flow diagram illustrating sub steps of the embodiment of FIG. 2.

FIG. 4 is a flow diagram illustrating a method of how to detect an increase in the time difference between received probe packets in the train of probe packets according to an embodiment called long average method. The method starts in step 405 for a received probe packet k. In this example the probe packet train comprises N packets and all probe packets of the train are used in the method; this is however not a requirement. The method may e.g. start with the second received probe packet, since it should be possible to extract at least one time difference value between the received probe packets.

In step 410 an ascending time difference mean value is determined by summing the time difference values between a number of probe packets of the probe packet train received prior to and including the packet k and dividing the sum by said number of time difference values dt. This means that the time difference value between packets k and packet number 1 is determined and divided by k, or more generally expressed: ascending_mean(k)=sum(dt(1) . . . dt(k))/k.

In step 415 a descending time difference mean value is determined by summing the time difference values between a number of probe packets of the probe packet train received after the packet k and dividing the sum by said number of probe packets of the probe packet train received after the packet k. This means that the time difference values between packets N and k are determined and divided by N−k+1, which should be the same as the number of summed time difference values, or more generally expressed: descending_mean(k)= sum(dt(k) . . . dt(N))/(N−k+1).

In the optional step 418 at least the first and/or the last of the measured average values are discarded in order to avoid the influence of outliers. Preferably, a few values, e.g. 5-10, at both ends of the train are discarded. Since the average is calculated from the end points of the train, any outlier near the end points may heavily affect the averages for the first few packets.

In step 420 the ascending and descending mean values described in steps 410 and 415 are compared, preferably by subtracting the descending mean value by the ascending mean value: diff_mean(k)=descending_mean(k+1)−ascending_mean(k). This value is the difference of the mean values of two separate regions of the train, where the first region includes the packet 1 . . . k and the second region includes the packets k+1 . . . N.

In step 425 a check if the probe packet k is the last of the probe packets to be used in the method, i.e. packet number N. If the probe packet is not packet number N, the method returns to step 405 according to alternative "No". Steps 405-425 are then performed for all probe packets remaining in the probe packet train until it in step 425 is determined that the steps have been performed for probe packet N.

If the check in step 425 results in that the probe packet is packet number N, the method moves to step 430 according to alternative "Yes". In step 430 it is then determined whether a comparison between the descending mean value and the ascending mean value exceeds said threshold criterion and if so the presence of a rate limiting mechanism in the data transfer path 16 is determined.

In step 435 it is determined for which packet, M, belonging to the train of probe packets 1-N, for which the difference between the descending mean value and the ascending mean value has a highest value. This packet, M, indicates the first packet of the probe packet train that is affected by the rate limiting mechanism 18 provided in the path 16. The packet M where diff_mean(k) has its maximum value thus indicates the border between the burst part and the mean-rate part of the train.

It should be noted that if it is not relevant to determine when the threshold criterion is exceeded, the method may according to an embodiment be interrupted as soon as the comparison in step 420 results in a difference between the descending and ascending mean values. The method may then directly proceed from step 420 to step 430 in which it is determined whether the threshold criterion is exceeded or not. If exceeded the method ends by determining the presence of a rate limiting mechanism in the data transfer path 16. If not exceeded the method may return to step 405.

According to alternative embodiments, the previously described step of determining the presence of rate limiter may be performed by using an edge detection method applying the so-called Canny method with Sobel filters.

According to another embodiment, the method may further comprise the step of performing a significance test 440 to determine if the mean-rate part significantly differs from the burst part. The significance test could be based on hypothesis testing where the null hypothesis is that the mean value of the time difference values for a second part of the probe packet train is the same as the mean value for the first part of the train due to random fluctuations of the time difference values. The alternative hypothesis is that the second part has a higher mean value due to a token bucket mechanism or some other rate limiting mechanism giving similar impact to a packet train.

It should here be noted that corresponding significance testing may be performed also for verifying the correctness of the determination of the presence of a rate limiter as determined by using the methods as described above with reference to FIGS. 2 and 3.

The test can be performed by using a so-called Student's t-test. A one-sample t-test is testing the null hypothesis that the population mean is equal to a specified value $\mu_0$, using the statistic:

$$t = \frac{\bar{x} - \mu_0}{s/\sqrt{n}},$$

where $\bar{x}$ is the sample mean, s is the sample standard deviation of the sample and n is the sample size. The degrees of freedom used in this test is n−1.

Here the second part of the train is the sample under test and the specified value $\mu_0$ is the mean of the first part of the train. The t value can then be calculated using:

$$\bar{x} - \mu_0 = \text{diff\_mean}(M),$$

$$s = \text{stddev}(dt(M+1) \ldots dt(N))$$

$$n = N - M.$$

Student's t-test assumes that the variances of the first and the last part of the train are the same. If they are not, the so-called Welch's t-test should be used instead:

$$t = \frac{\bar{X}_1 - \bar{X}_2}{s_{\bar{X}_1 - \bar{X}_2}}$$

Where $$s_{\bar{X}_1 - \bar{X}_2} = \sqrt{\frac{s_1^2}{n_1} + \frac{s_2^2}{n_2}},$$

$$s1 = \text{stddev}(dt(1) \ldots dt(M))$$

$$s2 = \text{stddev}(dt(M+1) \ldots dt(N))$$

$$n1 = M.$$

$$n2 = N - M.$$

The degrees of freedom can be approximated by Welch-Satterthwaite equation, $$v = \frac{\left(\frac{s_1^2}{N} + \frac{s_2^2}{N_2}\right)^2}{\frac{s_1^4}{N_1^2 \cdot v_1} + \frac{s_2^4}{N_2^2 \cdot v_2}} = \frac{\left(\frac{s_1^2}{N_1} + \frac{s_2^2}{N_2}\right)^2}{\frac{s_1^4}{N_1^2 \cdot (N_1 - 1)} + \frac{s_2^4}{N_2^2 \cdot (N_2 - 1)}}$$

Here $v_i = N_i - 1$, the degrees of freedom associated with the $i^{th}$ variance estimate.

There is also a simpler, but underestimating, formula for the degrees of freedom:

$$df = \min(n1, n2) - 1$$

Once a t value is determined, a probability value, p-value, can be found using e.g. a table of values from Student's t-distribution for a one-sided test. The one-sided test is chosen since the test is to find out only if the mean value of the last part is higher than the first part (If there was a test to find out if the value of the last part was higher or lower than the first part, the two-sided test should have been used instead).

If the calculated p-value is below the threshold chosen for statistical significance, then the null hypothesis is rejected in favor of the alternative hypothesis. The table below shows a t-distribution table with degrees of freedom in the first column and 1-p as the headers of each column:

| | 99% | 99.5% | 99.75% | 99.9% | 99.95% |
|---|---|---|---|---|---|
| 1 | 31.82 | 63.66 | 127.3 | 318.3 | 636.6 |
| 2 | 6.965 | 9.925 | 14.09 | 22.33 | 31.60 |
| 3 | 4.541 | 5.841 | 7.453 | 10.21 | 12.92 |
| 4 | 3.747 | 4.604 | 5.598 | 7.173 | 8.610 |
| 5 | 3.365 | 4.032 | 4.773 | 5.893 | 6.869 |
| 6 | 3.143 | 3.707 | 4.317 | 5.208 | 5.959 |
| 7 | 2.998 | 3.499 | 4.029 | 4.785 | 5.408 |
| 8 | 2.896 | 3.355 | 3.833 | 4.501 | 5.041 |
| 9 | 2.821 | 3.250 | 3.690 | 4.297 | 4.781 |
| 10 | 2.764 | 3.169 | 3.581 | 4.144 | 4.587 |
| 20 | 2.528 | 2.845 | 3.153 | 3.552 | 3.850 |
| 30 | 2.457 | 2.750 | 3.030 | 3.385 | 3.646 |
| 40 | 2.423 | 2.704 | 2.971 | 3.307 | 3.551 |
| 50 | 2.403 | 2.678 | 2.937 | 3.261 | 3.496 |
| 60 | 2.390 | 2.660 | 2.915 | 3.232 | 3.460 |
| 80 | 2.374 | 2.639 | 2.887 | 3.195 | 3.416 |
| 100 | 2.364 | 2.626 | 2.871 | 3.174 | 3.390 |
| 120 | 2.358 | 2.617 | 2.860 | 3.160 | 3.373 |
| \infty | 2.326 | 2.576 | 2.807 | 3.090 | 3.291 |

As an example, if the confidence level is chosen to be p=0.001 (1-99.9%) and the size of the last part of a train is 11 packets (10 degrees of freedom) the t-value must be above 4,144 in order to reject the null hypothesis.

The two previously described embodiments "significance test" and "long average method" may be combined into one single method, where the t-value and corresponding p-value is calculated for each packet. The minimum p-value would then indicate the border, provided that the p-value is below a specified confidence level.

Figure 5:
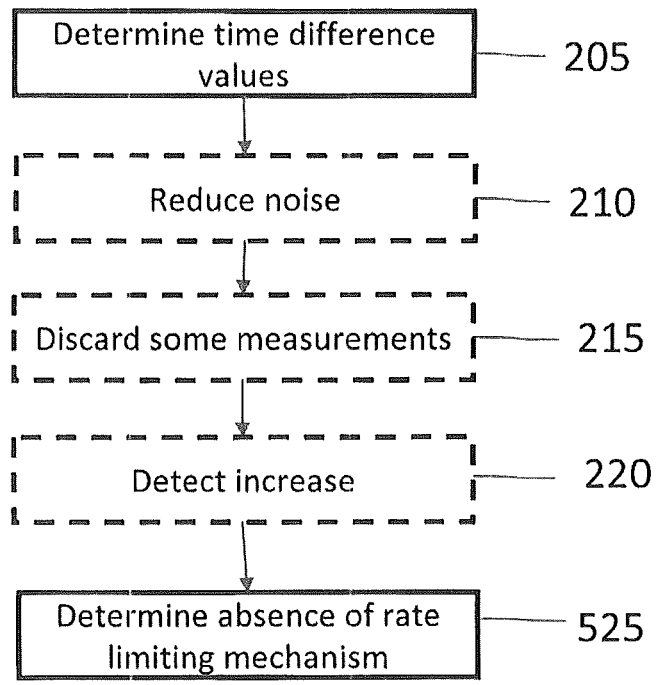
FIG. 5 is a flow diagram illustrating an embodiment of a method in a data communication system.

FIG. 5 is a flow diagram illustrating an embodiment of a method of determining the absence of a rate limiting mechanism arranged between a sending 12 and a receiving 14 data communication node in a data transfer path 16 of a communication network 10 (see FIG. 1). A train of probe packets sent from the sending node 12 is received in the receiving node 14 after having traversed the data transfer path 16 during real-time operation of the data transfer path. Steps 205, 210, 215, 220 are the same as the corresponding steps described with reference to FIG. 2. Step 220 may, however, not necessarily be performed. If e.g. there are no detected differences between the measured time difference values or the differences are too small to be taken into consideration (e.g. filtered away) no increase will be detected. In step 525, any detected increase will be compared to a threshold criterion and if the increase is below the threshold, it is determined that no rate limiting mechanism is present in the data transfer path 16. The threshold criterion may be according to any suitable previously described threshold criterion.

A significance test as previously described could here be performed as well, and in a corresponding manner. However, here the null hypothesis would be that a traffic shaper exists in the path; i.e. that an increase that exceeds the threshold criterion exists and/or that the mean value of the time difference values for a second part of the probe packet train significantly differs from the mean value for the first part of the train.

It should however be noted that the data transfer path 16 may comprise a plurality of links having different APC. This means that a first link in the path 16 could have a high APC and a second link could have a lower APC. The second link would then be the so called tight link. This means that a rate limiting mechanism arranged in the first path and configured to transmit packets at a rate that exceeds the TLC, i.e. the rate of the tight link, would not cause a variation in the measured time difference values received in the receiving node 14 arranged after the first and the second links. Thereby the method may only conclude that no rate limiting mechanism is provided in the tight link—in this case the second link.

In order to provide a reliable absence determination a very long probe packet train should be received and analyzed. Common APC measurements use probe packet trains comprising e.g. 17 probe packet. Unless these 17 probe packets are very large, such a train is way too small to, with reasonable certainty, determine the absence of a rate limiter. Instead, if a received probe packet train does not indicate the presence of a rate limiter, the receiving node may instruct the sending node to increase the size of the probe packet train. This may then continue until a defined maximum train size is transmitted on the path and received in the receiving node 14. If this maximum size train does not cause the threshold criterion to be exceeded, it is reasonable to draw the conclusion that no rate limiting mechanism is arranged in a tight link of the data transfer path.

Preferably, all steps of the embodiments described with reference to FIGS. 2-5 are performed in the apparatus 20.

Figure 7:
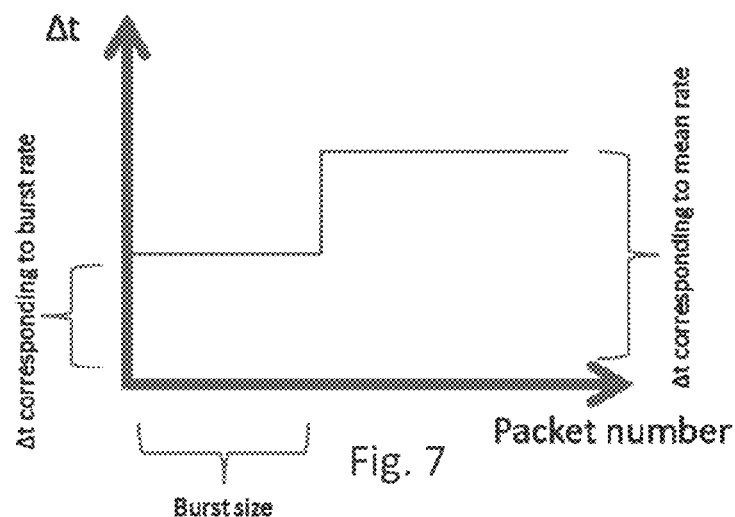
FIG. 7 is a diagram that schematically illustrates how the time differences between received probe packets vary.

FIG. 7 shows a diagram that schematically illustrates how the time differences between adjacent received probe packets vary. As shown in the figure the time difference values make up a step function $f(\Delta t)$, being equal to $\Delta t\_burstrate$ for a first set of probe packets and equal to $\Delta t\_meanrate$ for a second set of probe packets. The first set of probe packets thus has a time difference value $\Delta t$ that essentially corresponds to the burst rate of the rate limiting mechanism, whereas the second set of probe packets received in the receiving node has a time difference value $\Delta t$ that essentially corresponds to the mean rate of the rate limiting mechanism.

The mean rate may also be called a steady-state rate. In case there is no ongoing traffic, apart from the probe packets, the mean rate may also be called a Committed Information Rate (CIR) and the burst rate may be called Peak Information Rate (PIR). The CIR may also be defined as burst size divided by burst time.

The peak rate of the rate limiter may be estimated as the rate limiter burst size, except for the first received probe packet, divided by the time difference of the last and the first packet in the burst part of the train. The peak rate or the mean rate of the probe packets belonging to the first subset can thus be expressed as (total size of the packets of the first subset minus the size of the first packet in the first subset) divided by (the time difference between receipt of the last and the first packet in the first subset), i.e. the $PIR=(M-1)*b/(t(M)-t(1))$; where b is the mean size of the probe packets.

The CIR, or the mean rate of the probe packets belonging to the second subset may be estimated as the sum of the size of all probe packets in the second subset divided by the time difference of the last packet of the second subset and the last packet of the first subset, i.e. $CIR=(N-M)*b/(t(N)-t(M))$.

In case there is ongoing traffic in the tested data transfer path (which is the usual scenario), the ongoing traffic will also affect the rate limiter and e.g. partially fill the token bucket. This means that the rate limiting mechanism will affect more of the transmitted probe packets meaning that the shown step will move to the left in FIG. 7 and probe packets having a lower number will be delayed according to the mean rate of the rate limiter compared to the case of no ongoing traffic.

Figure 8:
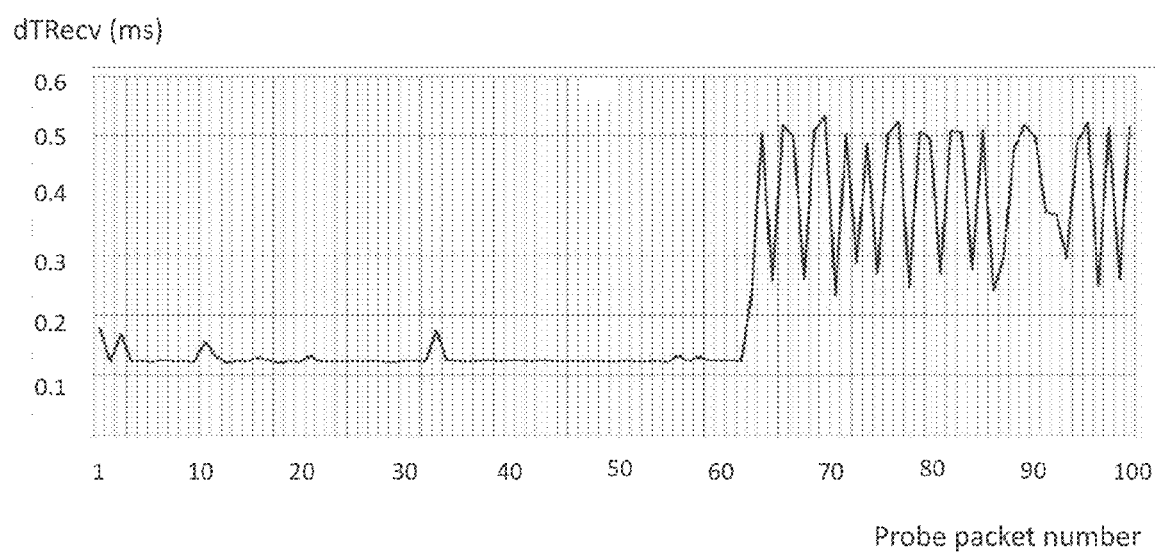
FIG. 8 is a diagram that shows measured time difference values between received probe packets.

FIG. 8 is a diagram that shows measured time difference values between adjacent received probe packets when a traffic shaper 18 is provided in the path 16. Probe packet trains were sent over Internet from a personal computer (PC) using a broadband fiber connection to a server and then back. The trains were sent with high rate (about 30 Mbps) using an extended version of the TWAMP protocol. The TWAMP reflector in the server sent back the trains to the PC also with a high rate. The send rate was higher than the subscription rate of 30 Mbps in both directions. Each probe packet in the trains was time stamped at both the sender and the receiver. The time differences of consecutive received packets were calculated for both forward and reverse path. Note that each train consisted of 100 packets, and that it required a lot more than the 17 packets that are usually used in APC measurements.

In FIG. 8, the time differences are shown for one train in the forward path, i.e. the receiving node 14 being the server. As seen in the diagram the time differences between the received probe packets are approximately 0.12 ms when the rate limiter does not affect the traffic, i.e. the rate limiter forwards received packets at a burst rate. Some time difference values diverge from this value, probably due to noise or similar, see e.g. the spikes around packets numbered 10 and 33.

Figure 9:
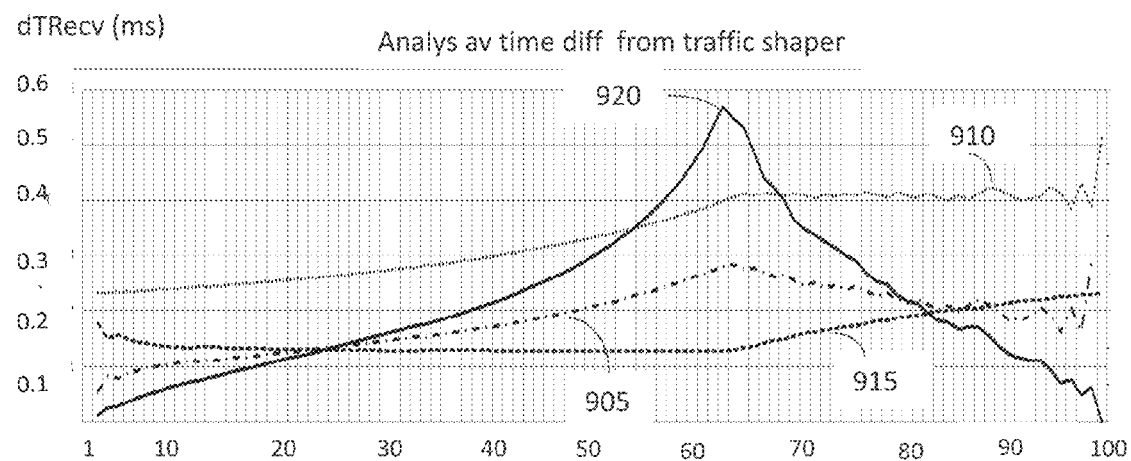
FIG. 9 is a diagram that shows an analysis of the measured time difference values of FIG. 8.

It can also be seen that there is a sharp increase in time difference values around packet number 63. Packet 63 thus indicates the border between the first and the second parts of the probe packet train. The first part has a mean time difference value of about 0.12 ms and the second part has a mean time difference value of about 0.4 ms corresponding to rates of 100 Mbps and 30 Mbps respectively FIG. 9 is a diagram that shows an analysis of the measured time difference values of FIG. 8. The dash-dotted line 905 indicates the difference between descending average values (dotted line 910) and ascending average values (dashed line 915) and is produced using the method described with reference to FIG. 4 above. Calculations give a maximum value for the line 905 around packet number 63.

The solid line 920 shows the Welch t-test parameter for the difference for each packet with a maximum at the same packet number as the difference—as expected. The t-value at packet number 3 is 14.3 and the degrees of freedom is approximately 35, which clearly rejects the null hypothesis that the first and the last part of the train have the same average at a confidence level way below p=0.001. Thus we can safely say that the train is split into a high speed part and a low speed part, probably as a result from a rate limiting mechanism, such as e.g. a token bucket.

The above mentioned determinations and estimation have all been done for the forward direction, i.e. on probe packets received in the receiving node 14. The above described methods would however work in a similar fashion for the reverse direction and on two-way traffic, i.e. on probe packets sent and received in the sending node 12.

Figure 10:
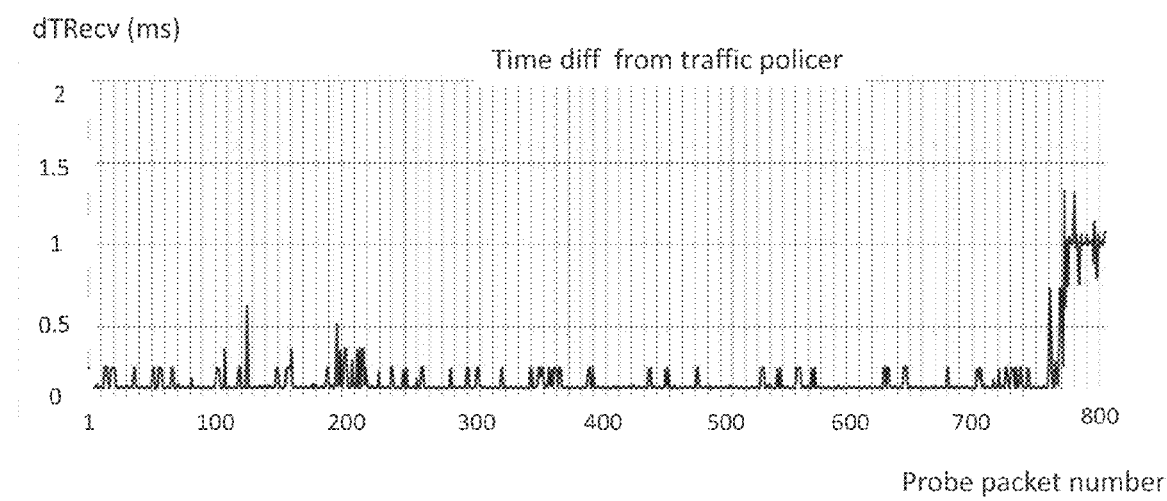
FIG. 10 is a diagram that shows measured time difference values between received probe packets.

FIG. 10 is a diagram that shows measured time difference values between adjacent received probe packets when a traffic policer 18 is provided in the path 16. The setting was similar to the test described with reference to FIG. 8. In this example the probe packet train consists of more than 800 packets.

In FIG. 10, the time differences are shown for one train in the forward path, i.e. the receiving node 14 being the server. As seen in the diagram the time differences between the received probe packets are, as in FIG. 8, approximately 0.12 ms when the rate limiter does not affect the traffic, i.e. the rate limiter forwards received packets at a burst rate. A few minor spikes, around 5-10 spikes every one hundred packets, occur and causes some time difference values to be around 0.25-0.3 ms. An occasional spike causes a time difference value to exceed 0.5 ms.

It can also be seen that there is a sharp increase in time difference values around packet number 770. Packet 770 thus indicates a border between the first and the second parts of the probe packet train, where the first part has a mean time difference value of about 0.12 ms and the second part has a mean time difference value of about 1 ms.

Figure 11:
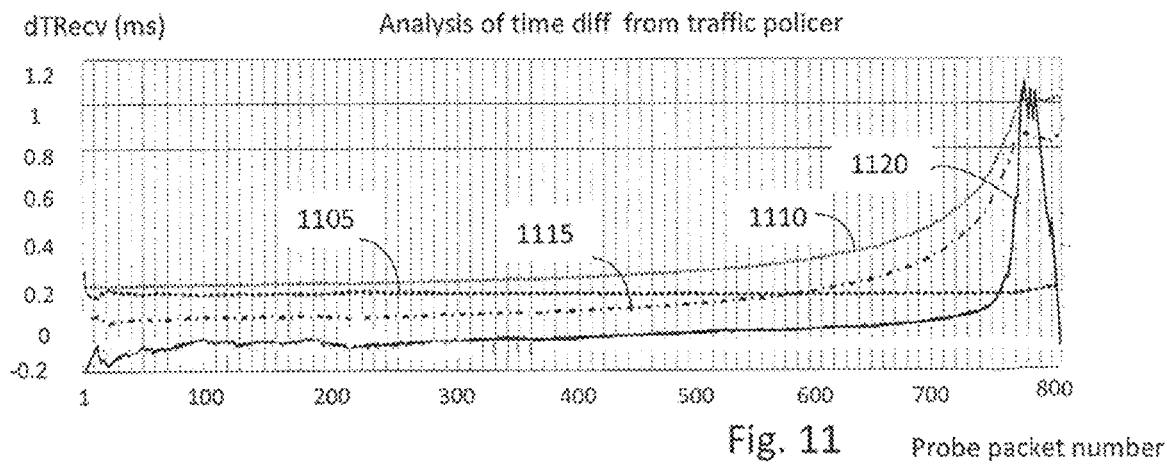
FIG. 11 is a diagram that shows an analysis of the measured time difference values of FIG. 10.

FIG. 11 is a diagram that shows an analysis of the measured time difference values of FIG. 10. The dash-dotted line 1105 indicates the difference between descending average values (dotted line 1110) and ascending average values (dashed line 1115) and is produced using the method described with reference to FIG. 4 above. Calculations give a maximum value for the line 1105 around packet number 770. The solid line 1120 shows the Welch t-test parameter for the difference for each packet with a maximum also around probe packet number 770.

Figure 12:
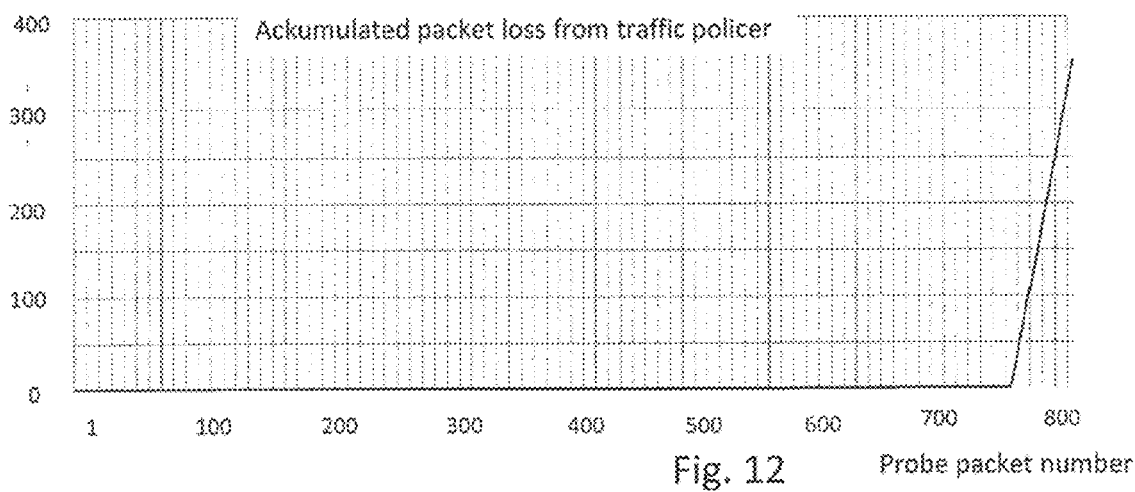
FIG. 12 is a diagram that shows an accumulated packet loss caused by a traffic policer arranged in a data path.

FIG. 12 is a diagram that shows an accumulated packet loss caused by a traffic policer arranged in a data path. As can be seen the number of lost packets increase drastically around packet number 760, which indicates that the rate limiter is a traffic policer.

Figure 13:
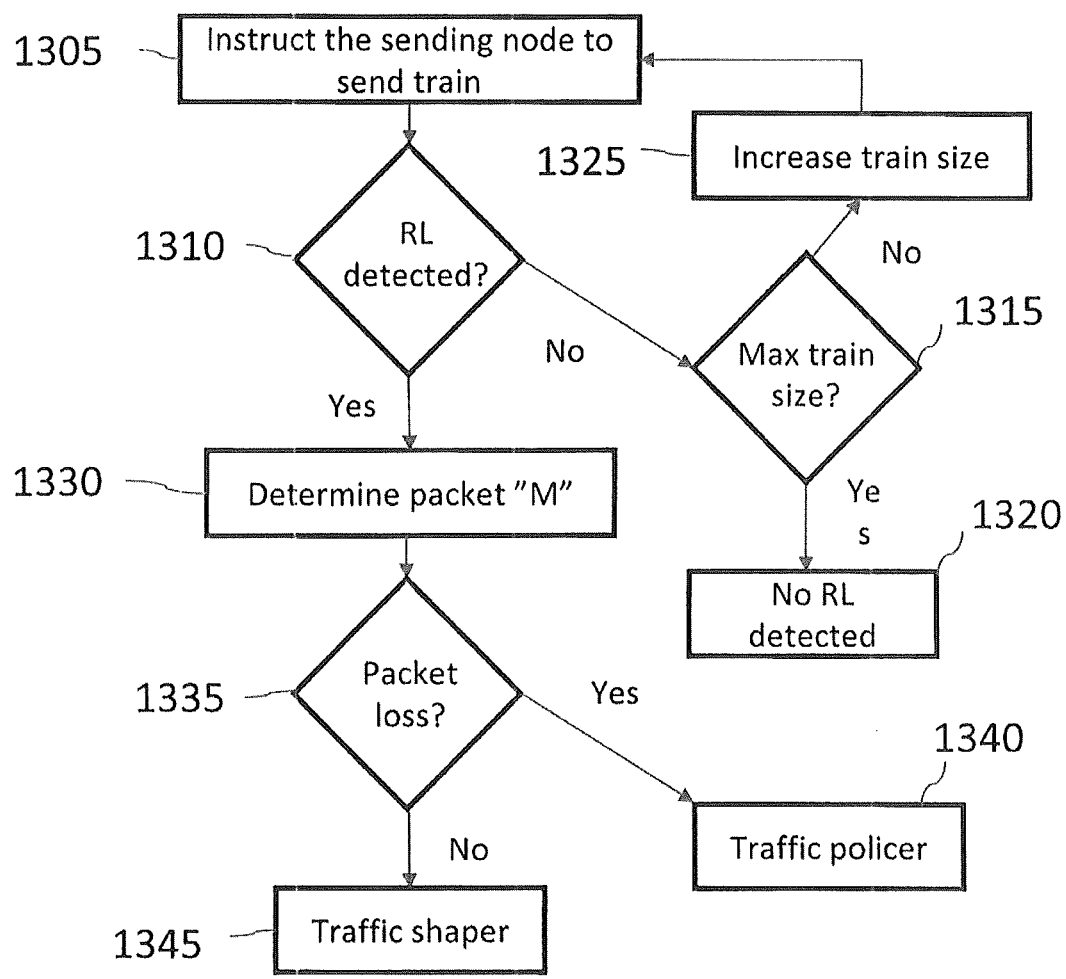
FIG. 13 is a flow diagram illustrating an embodiment of a method in a data communication system.

FIG. 13 is a flow diagram illustrating an embodiment of a method of determining the presence of a rate limiting mechanism in a data transfer path (see FIG. 1), and whether the rate limiting mechanism is a traffic shaper or a traffic policer. The method starts in step 1305 by the apparatus 20 instructing the sending node 12 to transmit a train of probe packets having a length of N packets.

In step 1310 it is determined whether a rate limiter is arranged in the path or not, preferably in accordance with the methods previously described herein. If no rate limiter is detected according to alternative "No" the method moves on to step 1315 in which it is checked if the train size is equal to a maximum predetermined train size. If so, according to alternative "Yes", it is in step 1320 determined that no rate limiting mechanism is detected in the path. If instead the train size is below the maximum train size, the train size is increased by a number of packets, and thereafter the method returns to step 1305.

If it in step 1310 is determined that a rate limiter is present in the path, according to alternative "Yes", the packet number "M", i.e. the first packet of the probe packet train that is affected by the rate limiting mechanism 18 provided in the path 16, is determined in step 1330. In step 1335 a packet loss check is performed. This means that the number of packets of the transmitted probe packet train is compared to the received number of probe packets and a comparison between packets lost for a first subset of probe packets significantly differs from a second subset of probe packets. The first subset is here the probe packets received prior to packet "M", and the second subset is the probe packets received after (and including) packet "M".

If the number of packets lost for the first subset is significantly lower than the packets lost for the second subset the method moves on to step 1340 according to alternative "Yes" in which step it is determined that the rate limiter is a traffic policer. If the number of packets lost for the first subset is instead approximately the same as the number of packets lost for the second subset the method moves on to step 1345 according to alternative "No" in which step it is determined that the rate limiter is a traffic shaper. The term significantly lower that is used above means that the number of packets lost for the first subset is e.g. 5-10 times lower than for the second subset, or that the second subset lost 20 packets more than the first subset, or that the ratio between lost and received probe packets differ by a set factor. Preferably the size of the transmitted probe packet train is taken into consideration in the determination if the number of packets lost is significantly lower for the first subset. The comparison may also be done by a significance test comparing the number of packets lost in both subsets.

Modifications and other variants of the described embodiments) will come to mind to one skilled in the art having the benefit of the teachings presented in the foregoing descriptions and the associated drawings. Therefore, it is to be understood that the embodiment(s) is/are not to be limited to the specific examples disclosed and that modifications and other variants are intended to be included within the scope of this disclosure. Although specific terms may be employed herein, they are used in a generic and descriptive sense only and not for purposes of limitation.

The invention claimed is:

1. A method of determining the presence of a rate limiting mechanism arranged between a sending and a receiving data communication node in a data transfer path of a communication network, the method comprising:
   determining time difference values between probe packets in a train of probe packets sent from the sending node and received in the receiving node after having traversed the data transfer path during real-time operation of the data transfer path; and
   determining the presence of a rate limiting mechanism in the data transfer path, wherein the determining the presence of a rate limiting mechanism comprises, for each received probe packet k of the probe packet train:
      determining an ascending time difference mean value using the time difference values between a number of probe packets of the probe packet train received prior to and including the packet k;
      determining a descending time difference mean value using the time difference values between a number of probe packets of the probe packet train received after and including the packet k;
      comparing the ascending mean value and the descending mean value; and
      determining that a difference between the descending mean value and the ascending mean value exceeds a threshold criterion,
   wherein the rate limiting mechanism comprises a traffic shaper or a traffic policer.

2. The method according to claim 1, wherein the determining the presence of a rate limiting mechanism comprises:
   determining that a first subset of said probe packets having a first time difference mean value, and a second subset of said probe packets having a second time difference mean value;
   comparing the second time difference mean value and the first time difference mean value; and
   determining that a difference between the second time difference mean value and the first time difference mean value exceeds said threshold criterion.

3. The method according to claim 1, further comprising determining a probe packet for which the difference between the descending mean value and the ascending mean value has a highest value.

4. The method according to claim 1, wherein the determining the presence of a rate limiting mechanism comprises determining that the value of a function $\partial f(\Delta t)/\partial t$ exceeds said threshold criterion, where $f(\Delta t)$ is a function representing the time difference between adjacent probe packets received in the receiving node.

5. The method according to claim 1, wherein the determining the presence of a rate limiting mechanism comprises determining that a plurality of consecutive time difference values exceeds said threshold criterion.

6. The method according to claim 1,
   wherein the determining time difference values comprises performing noise reduction by determining time difference values from a plurality of probe packet trains, and wherein the determining the presence of a rate limiting mechanism comprises using an average of corresponding time difference values for corresponding probe packets from said plurality of probe packet trains.

7. The method according to claim 1, further comprising: estimating a size of the rate limiting mechanism by calculating the total size of probe packets received before said increase in time difference values between received probe packets.

8. The method according to claim 1, further comprising: determining if the rate limiting mechanism is a traffic shaper or a traffic policer by comparing the number of probe packets lost after said increase with the number of probe packets lost before said increase.

9. The method according to claim 1, further comprising: instructing the sending node to increase the size of the probe packets in the train.

10. The method according to claim 1, further comprising: performing a significance test to determine whether the threshold criterion is exceeded or not.

11. A non-transitory computer readable storage medium storing computer program instructions which when executed by a processor, causes the processor to perform the method of claim 1.

12. A method of determining the absence of a rate limiting mechanism at a tight link in a data transfer path between a sending and a receiving data communication node of a communication network, the method comprising:
based on time difference values determined between probe packets in a train of probe packets sent from the sending node and received in the receiving node after having traversed the data transfer path during real-time operation of the data transfer path, determining the absence of a rate limiting mechanism at the tight link responsive to the time difference values between received probe packets in the train of probe packets being below a threshold criterion,
wherein the determining the absence of the rate limiting mechanism comprises, for each received probe packet k of the probe packet train:
determining an ascending time difference mean value using the time difference values between a number of probe packets of the probe packet train received prior to and including the packet k;
determining a descending time difference mean value using the time difference values between a number of probe packets of the probe packet train received after and including the packet k;
comparing the ascending mean value and the descending mean value; and
determining that a difference between the descending mean value and the ascending mean value is below the threshold criterion,
wherein the rate limiting mechanism comprises a traffic shaper or a traffic policer.

13. A device for determining the presence of a rate limiting mechanism arranged between a sending and a receiving data communication node in a data transfer path of a communication network, the device comprising:
a communications interface configured to communicate via the network; and a processor coupled to the communications interface and configured to:
determine time difference values between probe packets in a train of probe packets sent from the sending node and received in the receiving node after having traversed the data transfer path during real-time operation of the data transfer path; and
determine the presence of a rate limiting mechanism arranged in said data transfer path, wherein the determine the presence of a rate limiting mechanism comprises, for each received probe packet k of the probe packet train:
determining an ascending time difference mean value using the time difference values between a number of probe packets of the probe packet train received prior to and including the packet k;
determining a descending time difference mean value using the time difference values between a number of probe packets of the probe packet train received after and including the packet k;
comparing the ascending mean value and the descending mean value; and
determining that a difference between the descending mean value and the ascending mean value exceeds a threshold criterion,
wherein the rate limiting mechanism comprises a traffic shaper or a traffic policer.

14. A device for determining the absence of a rate limiting mechanism at a tight link in a data transfer path between a sending and a receiving data communication node of a communication network, the device comprising:
a communications interface configured to communicate via the network; and
a processor coupled to the communications interface and configured to:
based on time difference values determined between probe packets in a train of probe packets sent from the sending node and received in the receiving node after having traversed the data transfer path during real-time operation of the data transfer path, determine the absence of a rate limiting mechanism at the tight link responsive to the time difference values between received probe packets in the train of probe packets being below a threshold criterion,
wherein the determining the absence of the rate limiting mechanism comprises, for each received probe packet k of the probe packet train:
determining an ascending time difference mean value using the time difference values between a number of probe packets of the probe packet train received prior to and including the packet k;
determining a descending time difference mean value using the time difference values between a number of probe packets of the probe packet train received after and including the packet k;
comparing the ascending mean value and the descending mean value; and
determining that a difference between the descending mean value and the ascending mean value is below the threshold criterion,
wherein the rate limiting mechanism comprises a traffic shaper or a traffic policer.

* * * * *

UNITED STATES PATENT AND TRADEMARK OFFICE
CERTIFICATE OF CORRECTION

| | | |
|---|---|---|
| PATENT NO. | : 9,270,568 B2 | Page 1 of 2 |
| APPLICATION NO. | : 14/056706 | |
| DATED | : February 23, 2016 | |
| INVENTOR(S) | : Flinta et al. | |

It is certified that error appears in the above-identified patent and that said Letters Patent is hereby corrected as shown below:

On the Title Page

In the illustrative figure, Tag "435", in Line 1, delete ""M"" and insert -- "M" --.

On Page 2, item (56), under "OTHER PUBLICATIONS", in Column 2, Line 2, delete "Inc," and insert -- Inc., --, therefor.

In the Drawings

In Fig. 4, Sheet 3 of 8, for Tag "435", in Line 1, delete ""M"" and insert -- "M" --, therefor.

In Fig. 9, Sheet 6 of 8, delete "Analys av" and insert -- Analysis of --, therefor.

In Fig. 12, Sheet 7 of 8, delete "Ackumulated" and insert -- Accumulated --, therefor.

In Fig. 13, Sheet 8 of 8, for Tag "1330", in Line 1, delete ""M"" and insert -- "M" --, therefor.

In the Specification

In Column 2, Line 10, delete "bucket," and insert -- bucket. --, therefor.

In Column 2, Line 36, delete "bucket," and insert -- bucket. --, therefor.

In Column 4, Line 29, delete "Tight" and insert -- "Tight --, therefor.

In Column 5, Line 43, delete "to calculates" and insert -- to calculate --, therefor.

In Column 5, Line 43, delete "values" and insert -- value □ --, therefor.

In Column 5, Line 46, delete "values E." and insert -- values □. --, therefor.

Signed and Sealed this
Tenth Day of July, 2018

Andrei Iancu
*Director of the United States Patent and Trademark Office*

CERTIFICATE OF CORRECTION (continued)
U.S. Pat. No. 9,270,568 B2

In Column 8, Line 13, delete "θ(Δt)/θt," and insert -- $\partial f(\Delta t)/\partial t$, --, therefor.

In Column 8, Line 23, delete "θf(Δt)/θt" and insert -- $\partial f(\Delta t)/\partial t$ --, therefor.

In Column 9, Line 3, delete "train" and insert -- train. --, therefor.

In Column 11, Line 28, delete "Where" and insert -- where --, therefor.

In Column 11, Line 32, delete "s1" and insert -- $s_1$ --, therefor.

In Column 11, Line 33, delete "s2" and insert -- $s_2$ --, therefor.

In Column 11, Line 35, delete "n1=M." and insert -- $n_1$=M --, therefor.

In Column 11, Line 36, delete "n2=N-M." and insert -- $n_2$=N-M. --, therefor.

In Column 11, Lines 40-45, delete "$\left(\frac{s_1^2}{N_1} + \frac{s_2^2}{N_2}\right)^2$" and insert -- $\left(\frac{s_1^2}{N_1} + \frac{s_2^2}{N_2}\right)^2$ --, therefor.

In Column 11, Line 49, delete "Here" and insert -- here --, therefor.

In Column 11, Line 54, delete "df=min(n1, n2)-1" and insert -- df=min(n1, n2)-1. --, therefor.

In Column 12, Line 23, delete "4,144" and insert -- 4.144 --, therefor.

In Column 14, Line 23, delete "respectively" and insert -- respectively. --, therefor.

In Column 14, Line 34, delete "number 3" and insert -- number 63 --, therefor.

In Column 15, Lines 66-67, delete "embodiments)" and insert -- embodiment(s) --, therefor.

In the Claims

In Column 18, Lines 5-6, in Claim 13, delete "determine" and insert -- determining --, therefor.